(12) United States Patent
Owyang

(10) Patent No.: US 7,828,315 B2
(45) Date of Patent: Nov. 9, 2010

(54) ADJUSTABLE ATTACHMENT APPARATUS FOR A FOOTPEG ASSEMBLY

(76) Inventor: Mon Spencer Owyang, 212 Fanmar Way, Capitola, CA (US) 95010

( * ) Notice: Subject to any disclaimer, the term of this patent is extended or adjusted under 35 U.S.C. 154(b) by 155 days.

(21) Appl. No.: 12/218,818

(22) Filed: Jul. 17, 2008

(65) Prior Publication Data

US 2009/0020980 A1   Jan. 22, 2009

Related U.S. Application Data

(60) Provisional application No. 60/961,359, filed on Jul. 20, 2007.

(51) Int. Cl.
*B62J 25/00* (2006.01)
(52) U.S. Cl. .................... 280/291; 280/166; 74/564; 296/75
(58) Field of Classification Search ............... 280/291, 280/166; 74/564; 296/75
See application file for complete search history.

(56) References Cited

U.S. PATENT DOCUMENTS

| | | |
|---|---|---|
| 4,456,090 A | 6/1984 | Malenotti |
| 4,546,993 A | 10/1985 | Walker |
| 5,720,359 A | 2/1998 | Attenello |
| 5,779,254 A | 7/1998 | James et al. |
| 5,826,900 A | 10/1998 | Steele |
| D400,827 S | 11/1998 | Moore |
| 6,152,474 A | 11/2000 | Rupert |
| 6,173,983 B1 | 1/2001 | Moore |
| 6,217,050 B1 * | 4/2001 | Dickie et al. ............... 280/291 |
| 6,578,652 B1 * | 6/2003 | Kobacker et al. ........... 180/219 |
| 6,688,629 B2 | 2/2004 | Essinger |
| 6,957,821 B2 | 10/2005 | Gorman et al. |
| 7,040,442 B2 | 5/2006 | McWhorter |
| 7,114,739 B2 | 10/2006 | Colano |
| D564,419 S | 3/2008 | Clontz |
| 2006/0181054 A1 * | 8/2006 | Colano ...................... 280/291 |

* cited by examiner

*Primary Examiner*—Lesley Morris
*Assistant Examiner*—Marlon A Arce
(74) *Attorney, Agent, or Firm*—Roeder & Broder LLP; James P. Broder

(57) ABSTRACT

An adjustable attachment apparatus for adjusting the position of a footpeg of a motorcycle relative to a frame of the motorcycle includes a primary adjuster, a secondary adjuster and a tertiary adjuster. The primary adjuster and the secondary adjuster adjust the footpeg in a first direction. The tertiary adjuster is spaced apart from the primary adjuster and the secondary adjuster, and adjusts the footpeg in a second direction that is different than the first direction. The second direction has a vector component that is substantially perpendicular to the first direction. The second direction can includes a first vector component that is substantially similar to the first direction and a second vector component that is substantially perpendicular to the first direction. The adjustable attachment apparatus can also include a footpeg positioner. The primary adjuster can include a plurality of sets of at least two attachment holes. Further, the footpeg positioner can be secured to at least one set of attachment holes. Movement of the footpeg positioner relative to the plurality of sets of attachment holes moves the footpeg along the first direction. The secondary adjuster can include a slot within which the footpeg is adapted to slidably move. A distance between adjacent sets of attachment holes is not greater than a distance that the footpeg slidably moves within the slot.

20 Claims, 2 Drawing Sheets

ADJUSTABLE ATTACHMENT APPARATUS FOR A FOOTPEG ASSEMBLY

RELATED APPLICATION

This Application claims the benefit on U.S. Provisional Application Ser. No. 60/961,359 filed on Jul. 20, 2007. The contents of U.S. Provisional Application Ser. No. 60/961,359 are incorporated herein by reference.

BACKGROUND

Recreational riding and competitive racing of two-wheeled vehicles such as motorcycles has become increasingly popular in recent years. Motorcycle riders place great value on the ability to precisely control the positioning of important mechanical components on their vehicles. For instance, the positioning of a motorcycle footpeg assembly, including a footpeg and shifter can vary significantly. More specifically, because riders can be almost any height and can have any body proportions, the ability to adjust the footpeg assembly upward, downward, forward and/or rearward is critical for both comfort and performance.

Accordingly, as the act of riding and racing a motorcycle requires a high level of attention, having footpeg assemblies which function in a fluid and natural fashion while the motorcycle is being ridden is also highly valued. Prior methods for adjusting and optimizing footpeg positioning can be confusing, imprecise and/or time-consuming. For example, these adjustment mechanisms can be clumsy and cannot offer the required level of precision and ease required for high-performance or other types of motorcycles.

SUMMARY

The present invention is directed toward an adjustable attachment apparatus for adjusting the position of a footpeg of a motorcycle relative to a frame of the motorcycle. In one embodiment, the adjustable attachment apparatus includes a primary adjuster, a secondary adjuster and a tertiary adjuster. The primary adjuster adjusts the footpeg in a first direction. The secondary adjuster adjusts the footpeg in the first direction. The tertiary adjuster adjusts the footpeg in a second direction that is different than the first direction. Further, the tertiary adjuster is spaced apart from the primary adjuster and the secondary adjuster.

In one embodiment, the second direction has a vector component that is substantially perpendicular to the first direction. In certain embodiments, the tertiary adjuster adjusts the footpeg in the first direction. Further, the second direction can includes a first vector component that is substantially similar to the first direction and a second vector component that is substantially perpendicular to the first direction. In one embodiment, the adjustable attachment apparatus also includes a footpeg positioner. In this embodiment, the primary adjuster can include a plurality of sets of at least two attachment holes. Further, the footpeg positioner can be secured to at least one set of attachment holes. Movement of the footpeg positioner relative to the plurality of sets of attachment holes moves the footpeg along the first direction.

In one embodiment, the secondary adjuster includes a slot. In this embodiment, the footpeg is adapted to slidably move along the slot in the first direction. In accordance with one embodiment, a distance between adjacent sets of attachment holes is not greater than a distance that the footpeg slidably moves within the slot.

In another embodiment, the adjustable attachment apparatus includes an outer component, an inner component and a footpeg positioner. The inner component rotatably moves within the outer component. The inner component can have a plurality of sets of attachment holes. The footpeg positioner is movably secured to one of the sets of attachment holes of the inner component. Further, the footpeg positioner includes a slot, and the footpeg is movably secured within the slot.

The present invention is also directed toward a method for adjusting a positioning of a footpeg of a motorcycle relative to a frame of the motorcycle.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
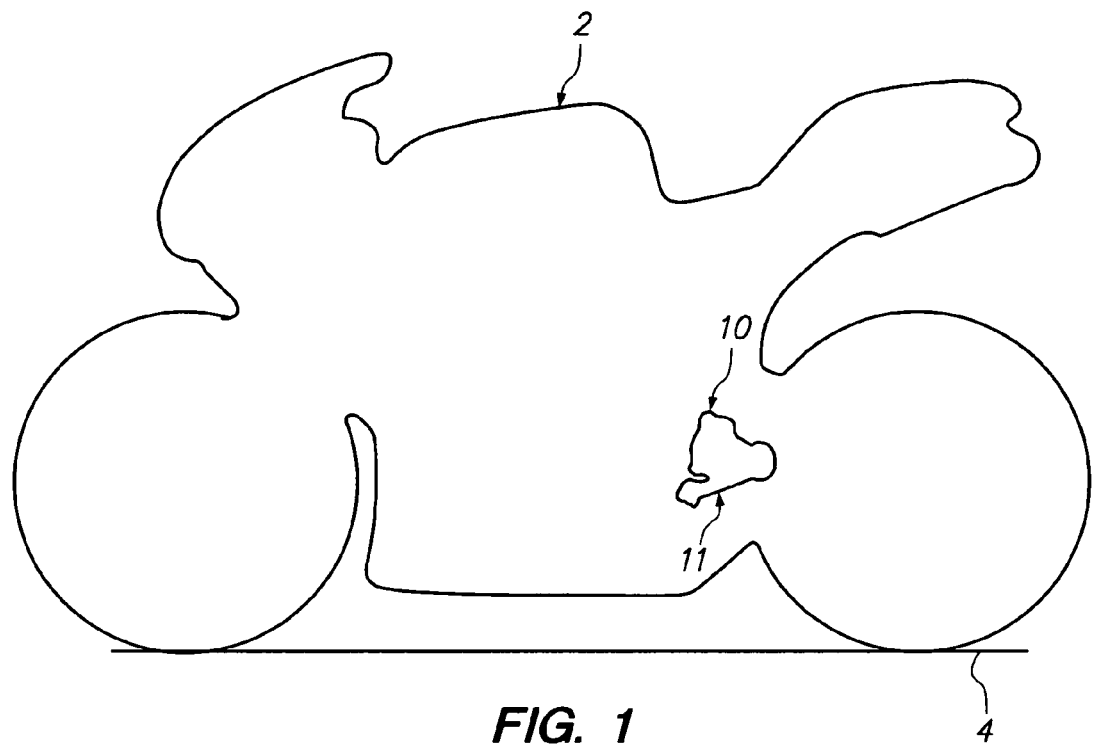
FIG. 1 is a simplified side view of a motorcycle and one embodiment of an adjustable attachment apparatus having features of the present invention.

FIG. 1 shows an outline of a motorcycle 2 and a surface 4 over which the motorcycle moves, and the approximate positioning of an adjustable attachment apparatus 10 (sometimes referred to herein as "attachment apparatus") and a footpeg assembly 11. In actual use, the attachment apparatus 10 is secured to the frame (not specifically shown) of the motorcycle 2 or other motorized vehicle (i.e. all-terrain vehicle, etc., not shown). As background, the attachment apparatus 10 and any components that are attached to the attachment apparatus 10, which can include footpegs, gear shifter, brake pedal, etc., are often collectively referred to herein and in the industry as a "rearset".

Figure 2:
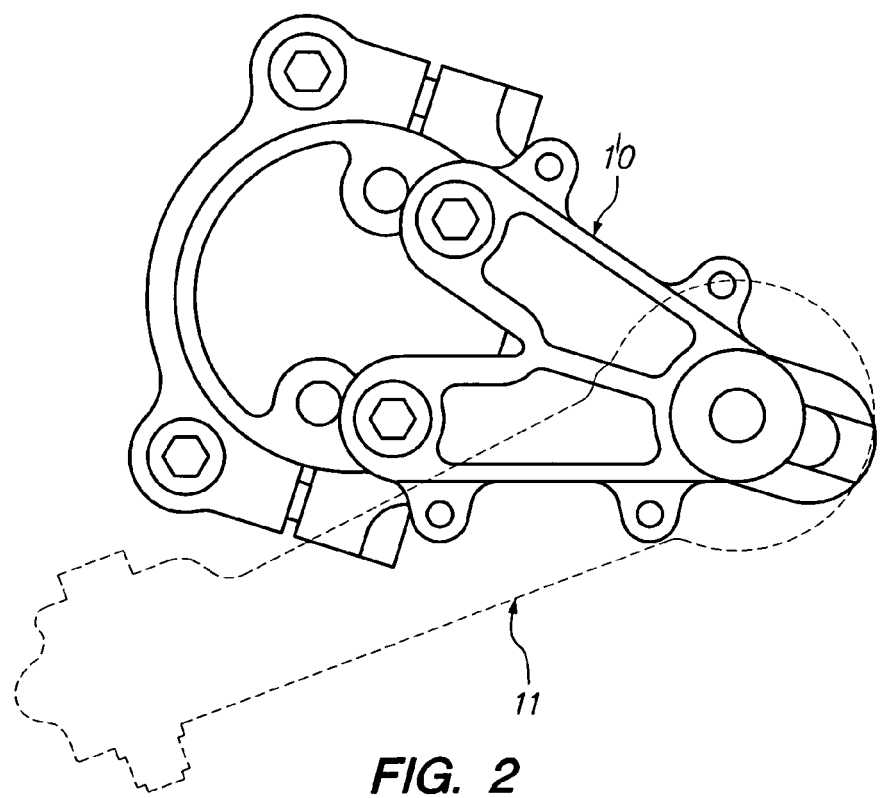
FIG. 2 is a side view of one embodiment of the adjustable attachment apparatus and a footpeg assembly.

FIG. 2 is a side view of the rearset, including the attachment apparatus 10 (in solid lines) and a footpeg assembly 11 (in phantom).

Figure 3:
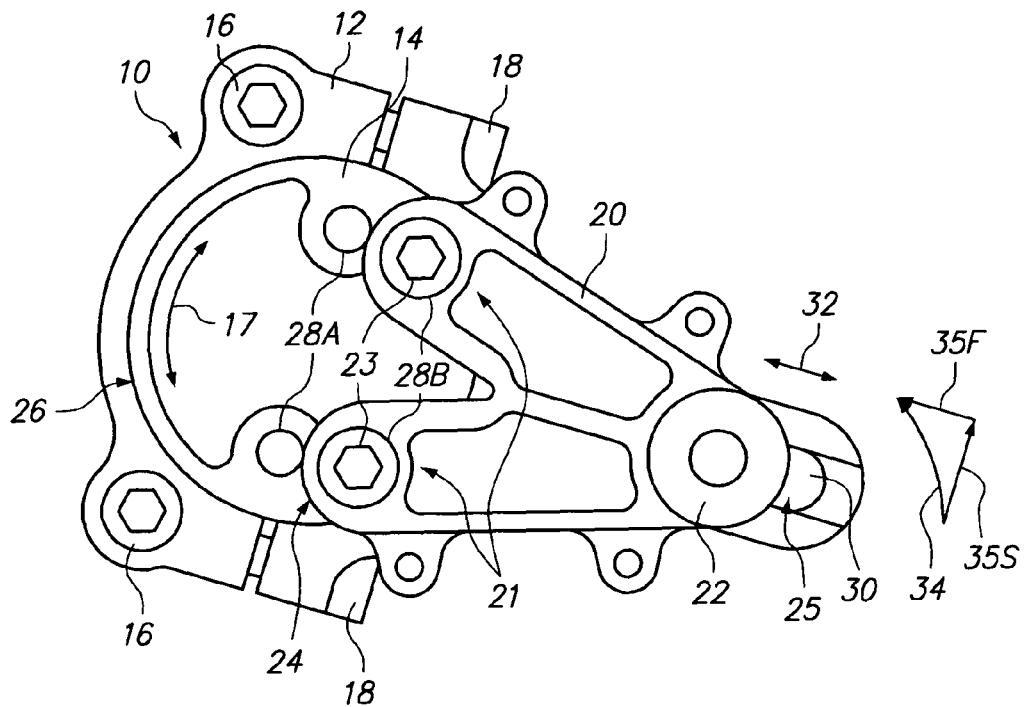
FIG. 3 is a side view of one embodiment of the adjustable attachment apparatus and a portion of the footpeg assembly.

FIG. 3 is a side view of the attachment apparatus 10 and a portion of the footpeg assembly 11 that is secured to the attachment apparatus 10. In the embodiment illustrated in FIG. 3, the attachment apparatus 10 includes an outer component 12 and an inner component 14. The outer component 12 is fixedly secured to the frame of the vehicle with one or more fasteners 16. The inner component 14 is rotatable relative to the outer component 12 in directions shown by arrow 17, and can be adjustably secured to the outer component 12. The outer component 12 includes one or more tighteners 18 that are used to secure the inner component 14 in place at a desired rotational angle relative to the outer component 12.

The attachment apparatus 10 also includes a footpeg positioner 20 that is secured to and extends away from the inner component 14. In certain embodiments, the footpeg positioner 20 can have somewhat of a "V" shaped configuration or an "A" shaped configuration, although any other suitable configuration can alternatively be used. In the embodiment illustrated in FIG. 3, the footpeg positioner 20 includes a one or more positioner arms 21 (two positioner arms 21 are illustrated in FIG. 3) that are secured to and extend away from the inner component 14. In these embodiments, the footpeg positioner 20 can include one or more positioner attachers 23 that secure the footpeg positioner 20 to the inner component 14. In the embodiment illustrated in FIG. 3, the footpeg positioner 20 includes two positioner attachers 23. With this design, the structural integrity and robustness of the footpeg positioner 20 is enhanced. In alternative embodiments, the footpeg positioner 20 can have other suitable configurations, and can include greater or fewer than two positioner attachers 23.

In certain embodiments, as the inner component 14 is rotated, the footpeg positioner 20 also moves relative to the outer component 12. The inner component 14 is secured in place to position the footpeg positioner 20 (and thus the footpeg 22) relative to the outer component 12 (and thus the frame of the motorcycle).

The footpeg assembly 11 includes a footpeg 22 that is secured to the footpeg positioner 20. In the embodiment illustrated in FIG. 3, the footpeg 22 is slidably secured to the footpeg positioner 20. Alternatively, the footpeg 22 can be non-slidably secured to the footpeg positioner 20, such as by movement along a camshaft or a worm gear, as non-exclusive examples. Still alternatively, the footpeg 22 can be secured to one of a plurality of threaded or non-threaded spaced apart or adjoining apertures (not shown).

The attachment apparatus 10 is configured to move the footpeg assembly 11 either independently or simultaneously in a first direction 32 and/or a second direction 34. In one embodiment, the first direction 32 is substantially linear, and the second direction 34 is rotational such that the second direction 34 has a first vector component 35F that is substantially similar to the first direction 32, and a second vector component 35S that is substantially perpendicular to the first direction 32. Thus, in certain embodiments, the first direction 32 and the second direction 34 are different from one another.

In one embodiment, the first direction 32 correlates to a substantially horizontal positioning and the second vector component 35S of the second direction 34 correlates to a substantially vertical positioning for ease of discussion. However, it is recognized that the first direction 32 and the second direction 34 can be interchangeable such that the first direction 32 is rotational and the second direction 34 is substantially linear. Further, as used herein, the terms "horizontal positioning" and "vertical positioning" are used for ease in understanding. It is recognized that during horizontal positioning, the footpeg assembly 11 moves in a predominantly fore and aft direction relative to the motorcycle frame and/or the surface 4 (illustrated in FIG. 1) over which the motorcycle travels, although the footpeg assembly may have somewhat of a vertical (or up and down) component to the movement. Somewhat similarly, during vertical positioning, the footpeg assembly 11 moves predominantly in an up and down direction relative to the motorcycle frame and/or the surface 4, although the footpeg assembly may also have somewhat of a horizontal (or fore and aft) component to the movement.

The specific ways that the footpeg assembly 11 can be adjusted horizontally and vertically relative to the frame of the motorcycle can vary. In various embodiments, the attachment apparatus 10 can includes one or more of a primary adjuster 24, a secondary adjuster 25 and a tertiary adjuster 26 for adjusting a positioning of the footpeg assembly 11 in the first direction 32. As used herein, the terms "primary", "secondary" and "tertiary" are not intended to impart a greater or lesser importance to the specific adjuster, but are used for ease of discussion and understanding only.

In one embodiment, the primary adjuster 24 allows the attachment of the footpeg positioner 20 to move relative to the inner component 14. In one embodiment, the inner component 14 can include at least two sets of attachment holes 28A, 28B (attachment holes 28B are obscured by footpeg positioner 20 in FIG. 3). The positioner attachers 23 can extend through one of the sets of attachment holes 28A, 28B to secure the footpeg positioner 20 to the inner component 14. Depending upon which set of attachment holes 28A, 28B is used, the horizontal positioning of the footpeg 22 is impacted. Additionally, the sets of attachment holes 28A, 28B are positioned on the inner component 14 so that when the inner component is rotated 180 degrees, the position of the holes 28A, 28B is changed. Thus, the sets of attachment holes 28A, 28B can be offset to provide a greater number of positional possibilities.

For example, in the position shown in FIG. 3, the attachment holes 28A, 28B of the inner component 14 provide two different horizontal positions for the footpeg positioner 20. In the embodiment illustrated in FIG. 3, the footpeg positioner 20 can be detached from the inner component 14, and the inner component 14 can be rotated relative to the outer component 12. The footpeg positioner 20 is then reattached to one set of attachment holes 28A, 28B of the inner component 14, thereby changing the horizontal positioning of the footpeg 22. To illustrate, when the inner component 14 is rotated by approximately 180 degrees relative to the outer component 12, one or two additional horizontal positions are created, depending upon whether attachment holes 28A are offset from dead center on the inner component 14.

The secondary adjuster 25 allows the footpeg 22 to move in the first direction 32, i.e. in a generally horizontal direction relative to the footpeg positioner 20. For example, in one non-exclusive embodiment, the secondary adjuster 25 can include a slot 30 along which the footpeg 22 can be slidably positioned in the first direction 32 illustrated in FIG. 3. This allows generally fore and aft movement of the footpeg 22. Alternatively, another suitable type of secondary adjuster 25 can be used. The footpeg 22 can be secured in place by typical methods known to those skilled in the art once the footpeg 22 is in the proper position (as determined by the rider). In an alternative embodiment, the slot 30 can be oriented in a direction that is different than the first direction 32 so that movement of the footpeg 22 along the slot 30 is at an angle relative to the first direction 32.

In one embodiment, a distance between the first set of attachment holes 28A and the second set of attachment holes 28B is less than or approximately equal to the distance that the footpeg 22 can slidably move in the slot 30. With this design, a continuum of an infinite number of horizontal positions for the footpeg 22 are possible. In another embodiment, additional sets of attachment holes (not shown) can be positioned at other rotational angles around the inner component 14. These additional sets of attachment holes can provide further horizontal positions for the footpeg positioner 20. For instance, an additional set of attachment holes on the inner component 14 can be positioned approximately 90 degrees (or some other rotational position) relative to the sets of attachment holes 28A and/or 28B illustrated in FIG. 3.

Further, the attachment apparatus 10 can include the tertiary adjuster 26. In one embodiment, the tertiary adjuster 26 adjusts the position of the footpeg assembly 11 to some degree along the first direction 32, and also along the second direction 34, which includes a substantially vertical (or up and down) component. In one embodiment, rotation of the inner component 14 relative to the outer component 12 by some rotational angle other than 180 degrees can change the up and down movement of the footpeg 22 relative to the frame. Thus, the rotational positioning of the inner component 14 relative to the outer component 12 can result in both a horizontal component and a vertical component of movement of the footpeg 22 relative to the outer component 12 and/or the surface 4. For example, if the inner component 14 is rotated by 10 degrees relative to the outer component 12 from the position illustrated in FIG. 3, the footpeg 22 moves predominantly in a direction of the second vector component 35S, and also moves the footpeg 22 to a lesser extent in a direction of the first vector component 35F. Depending upon the positioning of the inner component 14 relative to the outer component 12, the degree of movement along the first vector component 35F and the second vector component 35S changes.

Figure 4:
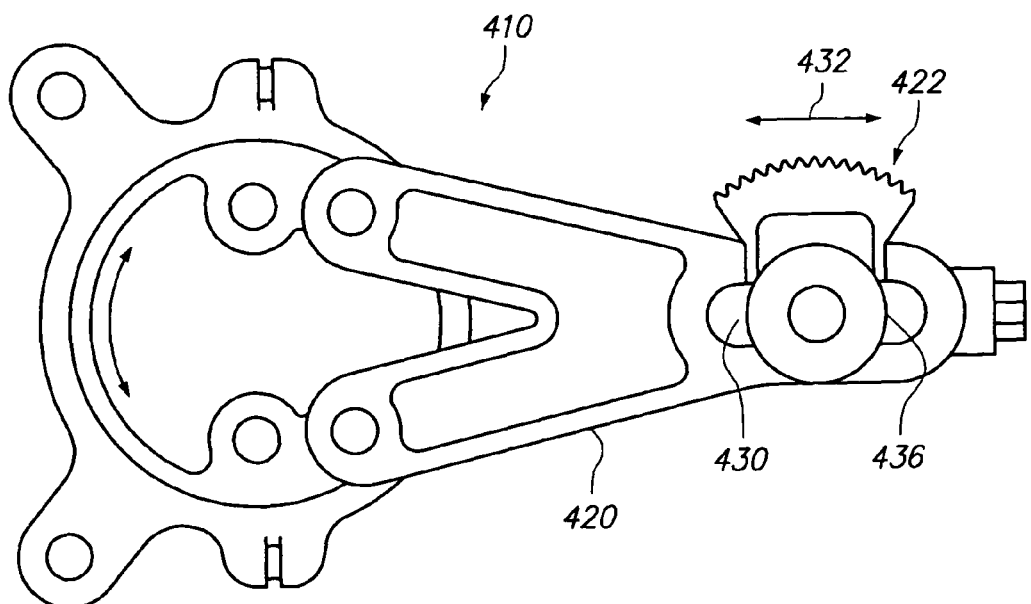
FIG. 4 is a side view of another embodiment of the adjustable attachment apparatus and a footpeg attached to the adjustable attachment apparatus.

FIG. 4 is a side view of another embodiment of the attachment apparatus 410, along with a footpeg 422 secured to the attachment apparatus 410. In the embodiment illustrated in FIG. 4, the secondary adjuster 426 includes a worm gear 436 or another suitable mechanism to cause movement of the footpeg 422 in the first direction 432 within the slot 430. Alternatively, other mechanisms can be used for moving the footpeg 422, which may or may not include the presence of a slot 430. For example, the footpeg 422 can be positioned in one of a number of predetermined spaced apart or adjoining apertures (not shown).

While the particular adjustable attachment apparatus 10 as shown and disclosed herein is fully capable of obtaining the objects and providing the advantages herein before stated, it is to be understood that it is merely illustrative of the presently preferred embodiments of the invention and that no limitations are intended to the details of the methods, construction or design herein shown and described.

What is claimed is:

1. An adjustable attachment apparatus for adjusting the position of a footpeg of a motorcycle relative to a frame of the motorcycle, the adjustable attachment apparatus comprising:
   a primary adjuster that adjusts the footpeg in a first direction;
   a secondary adjuster that adjusts the footpeg in the first direction; and
   a tertiary adjuster that adjusts the footpeg in a second direction that is different than the first direction, the tertiary adjuster fixedly securing the footpeg into position, the tertiary adjuster being spaced apart from the secondary adjuster.

2. The adjustable attachment apparatus of claim 1 wherein the second direction has a vector component that is substantially perpendicular to the first direction.

3. The adjustable attachment apparatus of claim 1 wherein the tertiary adjuster adjusts the footpeg in the first direction.

4. The adjustable attachment apparatus of claim 1 wherein the second direction includes a first vector component that is substantially similar to the first direction, and a second vector component that is substantially perpendicular to the first direction.

5. The adjustable attachment apparatus of claim 1 further comprising a footpeg positioner, wherein the primary adjuster includes a plurality of sets of at least two attachment holes, the footpeg positioner being secured to at least one set of attachment holes.

6. The adjustable attachment apparatus of claim 5 wherein movement of the footpeg positioner relative to the plurality of sets of attachment holes moves the footpeg along the first direction.

7. The adjustable attachment apparatus of claim 1 wherein the secondary adjuster includes a slot, the footpeg being adapted to slidably move along the slot in the first direction.

8. The adjustable attachment apparatus of claim 7 wherein further comprising a footpeg positioner, wherein the primary adjuster includes a plurality of sets of at least two attachment holes, the footpeg positioner being secured to at least one set of attachment holes, and wherein movement of the footpeg positioner relative to the plurality of sets of attachment holes moves the footpeg along the first direction.

9. The adjustable attachment apparatus of claim 8 wherein a distance between adjacent sets of attachment holes is not greater than a distance that the footpeg slidably moves within the slot.

10. An adjustable attachment apparatus for adjusting the position of a footpeg of a motorcycle relative to a frame of the motorcycle, the adjustable attachment apparatus comprising:
    an outer component;
    an inner component that rotatably moves within the outer component, the inner component having a plurality of sets of attachment holes; and
    a footpeg positioner that is movably secured to one of the sets of attachment holes of the inner component, the footpeg positioner including a slot, the footpeg being movably secured within the slot.

11. The adjustable attachment apparatus of claim 10 wherein movement of the footpeg positioner from a first set of attachment holes to a second set of attachment holes moves the footpeg in a first direction.

12. The adjustable attachment apparatus of claim 11 wherein movement of the footpeg along the slot moves the footpeg substantially in the first direction.

13. The adjustable attachment apparatus of claim 12 wherein rotation of the inner component relative to the outer component moves the footpeg in a second direction that is different than the first direction.

14. The adjustable attachment apparatus of claim 13 wherein the second direction has a vector component that is substantially perpendicular to the first direction.

15. The adjustable attachment apparatus of claim 13 wherein the second direction has a vector component that is substantially similar to the first direction.

16. The adjustable attachment apparatus of claim 10 wherein movement of the footpeg within the slot is greater than a distance between adjacent sets of attachment holes.

17. A method for adjusting a positioning of a footpeg of a motorcycle relative to a frame of the motorcycle, the method comprising the steps of:
    adjusting the position of the footpeg in a first direction with a primary adjuster;
    adjusting the position of the footpeg in the first direction with a secondary adjuster; and
    adjusting the position of the footpeg in a second direction that is different than the first direction with a tertiary adjuster, the tertiary adjuster fixedly securing the footpeg into position, the tertiary adjuster being spaced apart from the secondary adjuster.

18. The method of claim 17 wherein the second direction has a vector component that is substantially perpendicular to the first direction.

19. The method of claim 17 wherein the second direction has a vector component that is substantially similar to the first direction.

20. The method of claim 17 wherein the step of adjusting the position of the footpeg in the first direction with the primary adjuster includes securing a footpeg positioner to one of a plurality of sets of attachment holes, and wherein the step of adjusting the position of the footpeg in the first direction with the secondary adjuster includes moving the footpeg along a slot to move the footpeg in the first direction.

* * * * *